(12) United States Patent
Wong et al.

(10) Patent No.: US 11,272,512 B2
(45) Date of Patent: Mar. 8, 2022

(54) WIRELESS TELECOMMUNICATIONS APPARATUSES AND METHODS

(71) Applicant: Sony Corporation, Tokyo (JP)

(72) Inventors: Shin Horng Wong, Basingstoke (GB); Martin Warwick Beale, Basingstoke (GB); Brian Alexander Martin, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 172 days.

(21) Appl. No.: 16/476,111

(22) PCT Filed: Dec. 20, 2017

(86) PCT No.: PCT/EP2017/083899
§ 371 (c)(1),
(2) Date: Jul. 5, 2019

(87) PCT Pub. No.: WO2018/127424
PCT Pub. Date: Jul. 12, 2018

(65) Prior Publication Data
US 2019/0357219 A1   Nov. 21, 2019

(30) Foreign Application Priority Data

Jan. 6, 2017   (EP) .................................... 17150567

(51) Int. Cl.
*H04W 4/00* (2018.01)
*H04W 72/04* (2009.01)
*H04W 72/08* (2009.01)

(52) U.S. Cl.
CPC .... *H04W 72/0493* (2013.01); *H04W 72/0413* (2013.01); *H04W 72/0446* (2013.01); *H04W 72/0453* (2013.01); *H04W 72/08* (2013.01)

(58) Field of Classification Search
CPC .................................................. H04W 72/0493
See application file for complete search history.

(56) References Cited

U.S. PATENT DOCUMENTS 8,737,329 B2 *   5/2014   Ogawa ...................... H04L 1/00
                                                              370/329
10,117,256 B2 *  10/2018   Olfat ........................ H04L 67/12
(Continued)

FOREIGN PATENT DOCUMENTS

WO      2012/171093 A1      12/2012
WO   WO-2012171093 A1 *    12/2012   ........ H04W 72/0413
(Continued)

OTHER PUBLICATIONS

International Search Report and Written Opinion dated Mar. 22, 2018 for PCT/EP2017/083899 filed on Dec. 20, 2017, 14 pages.
(Continued)

*Primary Examiner* — Guang W Li
(74) *Attorney, Agent, or Firm* — Xsensus LLP

(57) ABSTRACT

A method of communicating data in a telecommunications system comprising a base station and a plurality of terminals operable to communicate data to and from the base station. The system is configured to transmit downlink signals using downlink resources in a frequency band and in a first time period and the method comprises, upon identification of uplink data to be transmitted by a first terminal of the plurality of terminals, dynamically selecting a set of resources for transmitting the uplink data, wherein selecting the set of resources comprises selecting a subset of the frequency band and a subset of the time period of the downlink resources, the selected set of resources being
(Continued)

based on the subset of the frequency band and the subset of the time period.

20 Claims, 6 Drawing Sheets

(56) References Cited

U.S. PATENT DOCUMENTS

| | | | | |
|---|---|---|---|---|
| 10,462,833 | B2* | 10/2019 | Wakabayashi | H04W 76/11 |
| 10,601,568 | B2* | 3/2020 | Zhang | H04L 5/0073 |
| 10,925,017 | B2* | 2/2021 | Wu | H04W 72/04 |
| 11,051,208 | B2* | 6/2021 | Islam | H04L 5/0044 |
| 11,071,136 | B2* | 7/2021 | Islam | H04W 72/14 |
| 11,160,105 | B2* | 10/2021 | Lin | H04W 72/1289 |
| 2011/0199957 | A1* | 8/2011 | Oyman | H04B 7/15592 370/315 |
| 2012/0093059 | A1* | 4/2012 | Bai | H04W 72/042 370/312 |
| 2014/0185539 | A1* | 7/2014 | Seo | H04B 7/2656 370/329 |
| 2015/0282202 | A1* | 10/2015 | Miao | H04L 5/006 370/329 |
| 2015/0282213 | A1* | 10/2015 | Sun | H04W 74/0833 370/329 |
| 2017/0012750 | A1* | 1/2017 | Chen | H04W 72/1231 |
| 2017/0064729 | A1* | 3/2017 | Sadek | H04L 5/0048 |
| 2017/0086216 | A1* | 3/2017 | Patil | H04W 76/14 |
| 2017/0223719 | A1* | 8/2017 | Huang | H04L 5/0057 |
| 2017/0367046 | A1* | 12/2017 | Papasakellariou | H04L 5/0053 |
| 2018/0302900 | A1* | 10/2018 | Ibars Casas | H04W 72/042 |

FOREIGN PATENT DOCUMENTS

| | | |
|---|---|---|
| WO | 2015/169098 A1 | 11/2015 |
| WO | 2016/015345 A1 | 2/2016 |
| WO | 2018/086807 A1 | 5/2018 |

OTHER PUBLICATIONS

Huawei et al., "Flexible air interface for 5G", 3GPP TSG RAN WG1 Meeting No. 84bis R1-162144, Busan Korea, Apr. 11-15, 2016, 3 pages.

Huawei et al., "Overview of 5G frame structure", 3GPP TSG RAN WG1 Meeting No. 84bis R1-162157, Busan Korea, Apr. 11-15, 2016, 6 pages.

Holma et al., "LTE for UMTS OFDMA and SC-FDMA Based Radio Access", Wiley 2009, System Architecture Based on 3GPP SAE, 11 pages.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN)", Overall description. Stage 2 Release 13, 3GPP TS 36.300 V13.5.0, Sep. 2016, pp. 1-313.

NTT DOCOMO, "New SID Proposal: Study on New Radio Access Technology", 3GPP TSG RAN Meeting No. 71 RP-160671, Göteborg, Sweden, Mar. 7-10, 2016, 8 pages.

* cited by examiner

WIRELESS TELECOMMUNICATIONS APPARATUSES AND METHODS

CROSS-REFERENCE TO RELATED APPLICATIONS

The present application is based on PCT filing PCT/EP2017/083899, filed Dec. 20, 2017, which claims priority to EP 17150567.0, filed Jan. 06, 2017, the entire contents of each are incorporated herein by reference.

BACKGROUND

Field

The present disclosure relates to wireless telecommunications apparatuses and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected that future wireless communications networks will efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance. A single device type might also be associated with different traffic profiles depending on the applications it is running. For example, different consideration may apply for efficiently supporting data exchange with a smartphone when it is running a video streaming application (high downlink data) as compared to when it is running an Internet browsing application (sporadic uplink and downlink data).

The new Radio Access Technology (RAT) for the next generation of mobile networks is expected to operate in a large range of frequencies, from hundreds of MHz to 100 GHz and it is expected to cover a broad range of use case, such as Enhanced Mobile Broadband (eMBB), Massive Machine Type Communications (mMTC), Ultra Reliable & Low Latency Communications (URLLC).

When using high frequency (e.g. of 28 GHz or more), the mobile network is expected to operate using Time Division Duplex "TDD" where the entire frequency band is switched to either downlink or uplink transmissions for a time period and can then switch to the other of downlink or uplink transmissions at a later time period. Typically, the bandwidth is expected to be very large, for example in the order of hundreds of MHz.

However, it is expected that transmitting uplink signals over large bandwidth is unlikely to utilise the UE power efficiently. In particular, the Power Spectral Density (PSD) is expected to be small such that a terminal would be likely to use only a small subset of the spectrum. In most cases, it is likely that allocating the entire bandwidth to uplink transmissions will create inefficiencies in the use of resources.

In some legacy wireless telecommunications networks, such as LTE-based networks, transmissions are mostly configured in the Frequency Division Duplex "FDD" mode (where different frequencies are used for uplink and downlink transmissions) while in some cases conventional TDD may also be used. Conventional or legacy systems therefore fail to provide any pointer for trying the address the efficiency problem discussed above.

In view of this, there is expected to be a desire for future wireless communications networks, for example those which may be referred to as 5G or new radio (NR) system/new radio access technology (RAT) systems, as well as future iterations/releases of existing systems, to efficiently support uplink transmissions in an arrangement that is otherwise configured to operate in a TDD mode.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF EXAMPLE EMBODIMENTS

Figure 1:
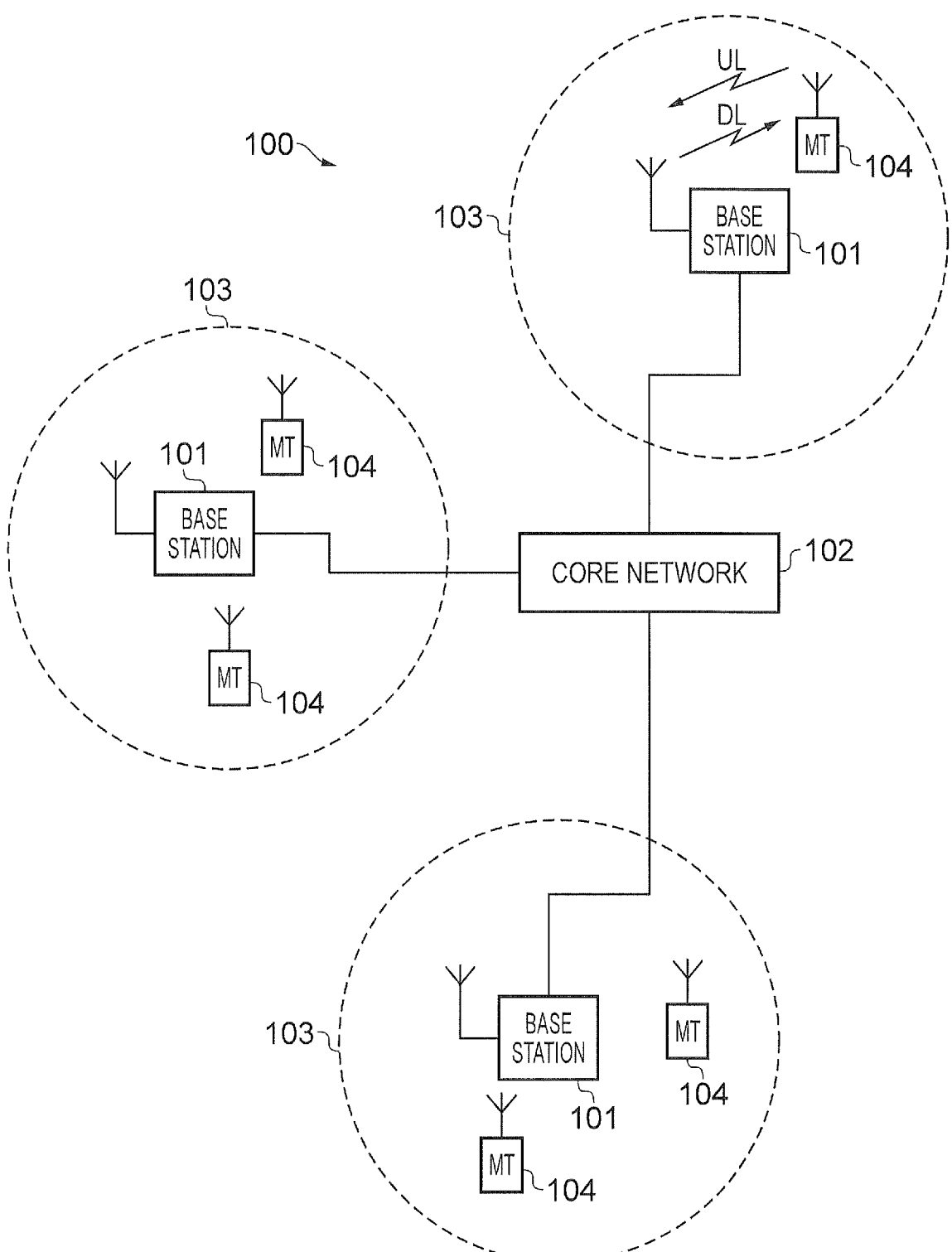
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles but which may also support other radio access technologies and which may implement embodiments of the disclosure as described herein. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards and previously proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations, nodeBs, e-nodeBs, eNB, g-nodeBs, gNB and so forth.

Figure 2:
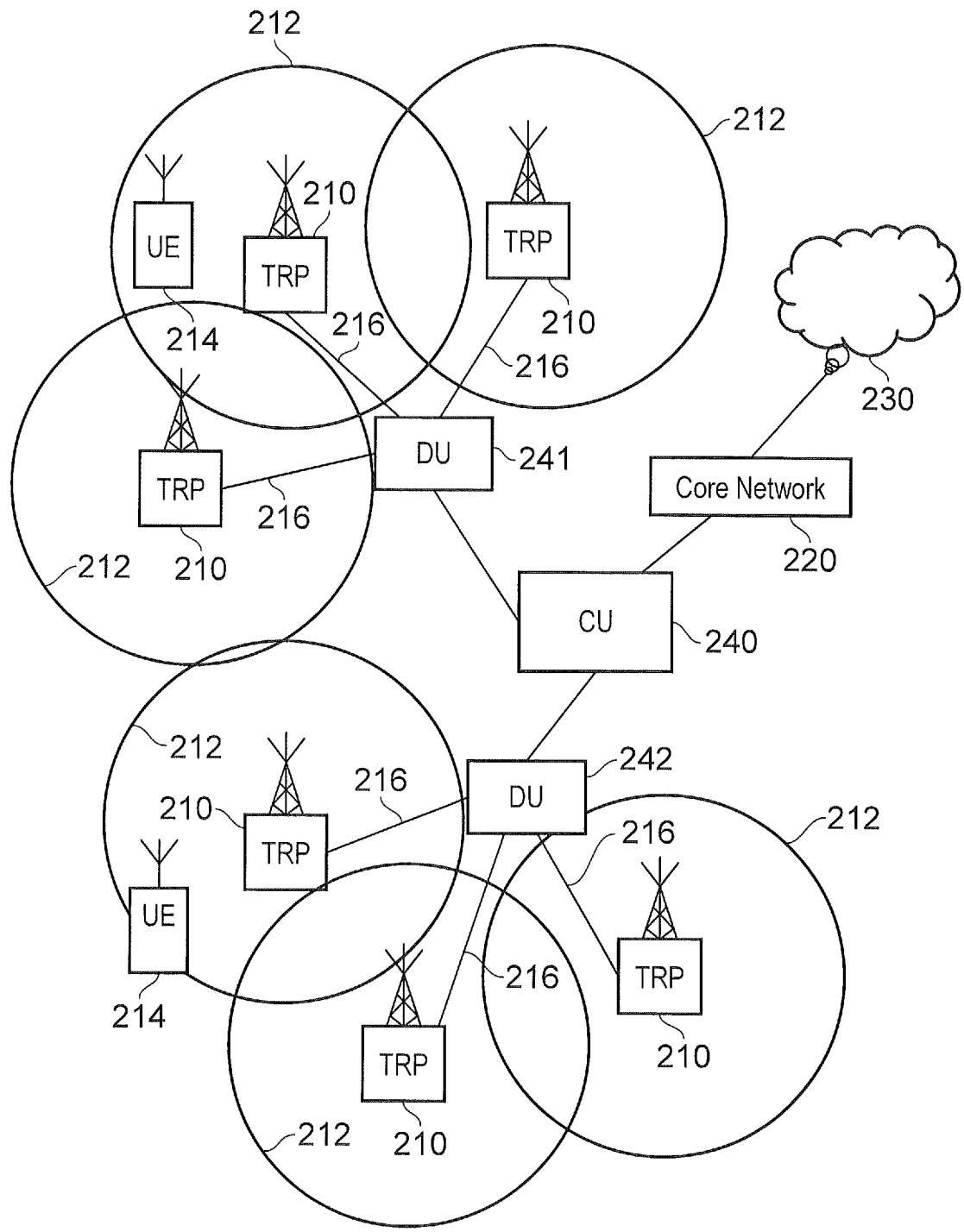
FIG. 2 is a schematic block diagram illustrating an example of a mobile telecommunication system with architectural components corresponding to that of an enhanced New Radio (NR) or 5G network.

An example configuration of a wireless communications network which uses some of the terminology proposed for NR and 5G is shown in FIG. 2. In FIG. 2 a plurality of transmission and reception points (TRPs) 210 are connected to distributed control units (DUs) 241, 242 by a connection interface represented as a line 216. Each of the TRPs 210 is arranged to transmit and receive signals via a wireless access interface within a radio frequency bandwidth available to the wireless communications network. Thus within a range for performing radio communications via the wireless access interface, each of the TRPs 210, forms a cell of the wireless communications network as represented by a dashed line 212. As such wireless communications devices 214 which are within a radio communications range provided by the cells 210 can transmit and receive signals to and from the TRPs 210 via the wireless access interface. Each of the distributed control units 241, 242 are connected to a central unit (CU) 240 via an interface.

The central unit 240 is then connected to the a core network 220 which may contain all other functions required to transmit data for communicating to and from the wireless communications devices and the core network 220 may be connected to other networks 230.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB of an LTE network. Similarly the communications devices 214 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Figure 3:
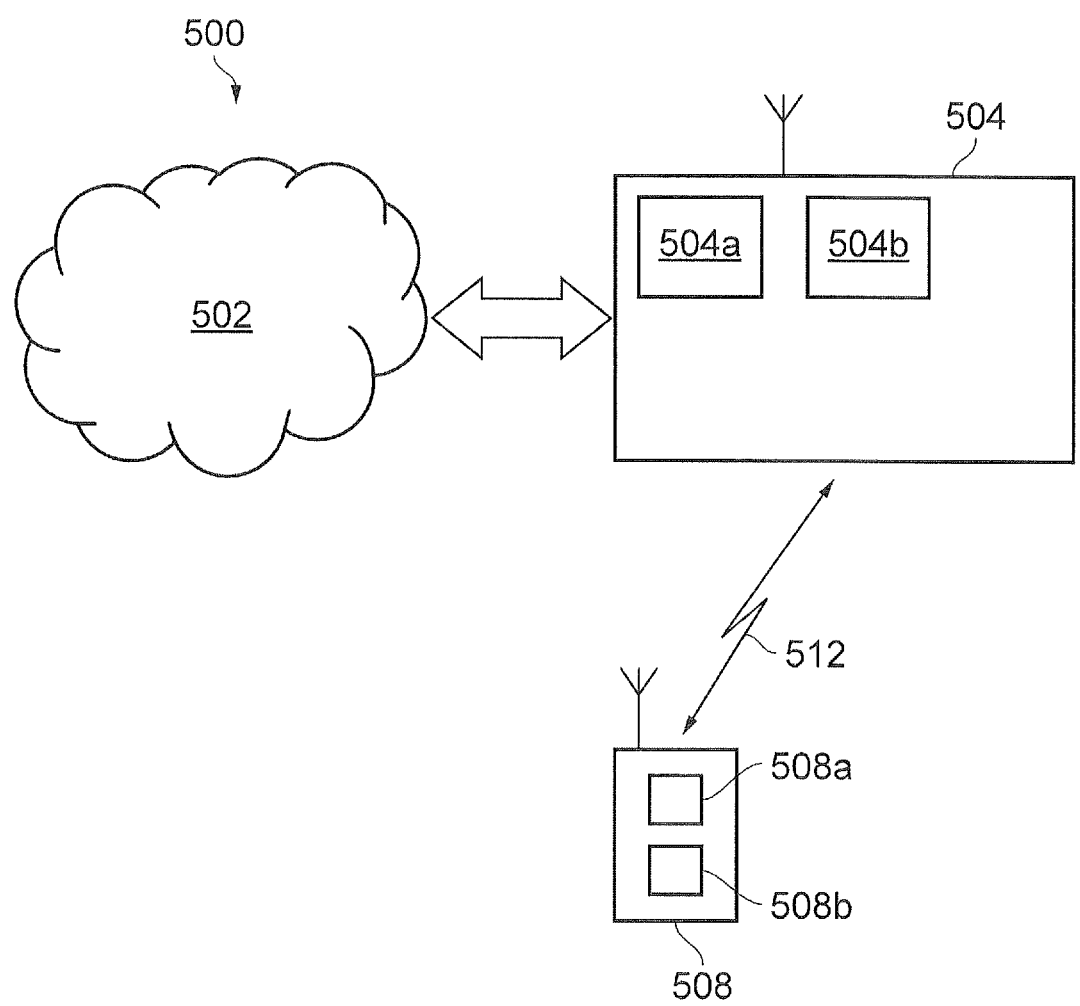
FIG. 3 schematically represents some aspects of a wireless telecommunications network configured to operate in accordance with certain embodiments of the present disclosure.

FIG. 3 schematically shows some further details of a telecommunications system 500 according to an embodiment of the present disclosure. The telecommunications system 500 in this example is based broadly around an LTE-type architecture and the telecommunications system may also support other radio access technologies, either using the same hardware as represented in FIG. 3 with appropriately configured functionality or separate hardware configured to operate in association with the hardware represented in FIG. 3. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. In this example, only one base station 504 and one terminal device 508 are represented in FIG. 3. However, it will of course be appreciated that in practice the radio network part will typically comprise a plurality of base stations serving a larger number of terminal devices across various communication cells, as well as potentially including transceiver stations supporting radio communications with terminal devices on cells operating in accordance with other radio access technologies, such as UTRAN, GERAN, WLAN or a 5G new RAT. However, only a single base station and terminal device are shown in FIG. 3 in the interests of simplicity.

The terminal device 508 is arranged to communicate data to and from the base station (transceiver station) 504. The base station is in turn communicatively connected to a serving gateway, S-GW, (not shown) in the core network part which is arranged to perform routing and management of mobile communications services to the terminal device in the telecommunications system 500 via the base station 504. In order to maintain mobility management and connectivity, the core network part 502 also includes a mobility management entity, MME, (not shown) which manages the enhanced packet service, EPS, connections with the terminal device 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 3 may be conventional apart from where modified to provide functionality in accordance with embodiments of the present disclosure as discussed herein. It will be appreciated embodiments of the invention may in general be implemented in wireless communications systems operating in accordance with different radio access technologies, for example, who one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 508 is adapted to support operations in accordance with embodiments of the present disclosure when communicating with the base station 504 as discussed further herein. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508a are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 3 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 3 for simplicity, the processor circuitry 504b may comprise scheduling circuitry, that is to say the processor circuitry 504b may be configured/programmed to provide the scheduling function for the base station 504.

It has been proposed that a wireless communications interface provided to a future wireless communications network may be operating with high frequency carriers such as those within a millimetre waveband, for example with a large frequency range between 20 GHz and 100 GHz to enable a large frequency bandwidth, for example with a few hundred MHz to 1 GHz, to be used offering very high throughput for eMBB services and support large capacity. However, operation in such large bandwidth in a TDD mode is likely to result in a relatively inefficient use of resources for uplink transmissions.

Figure 4:
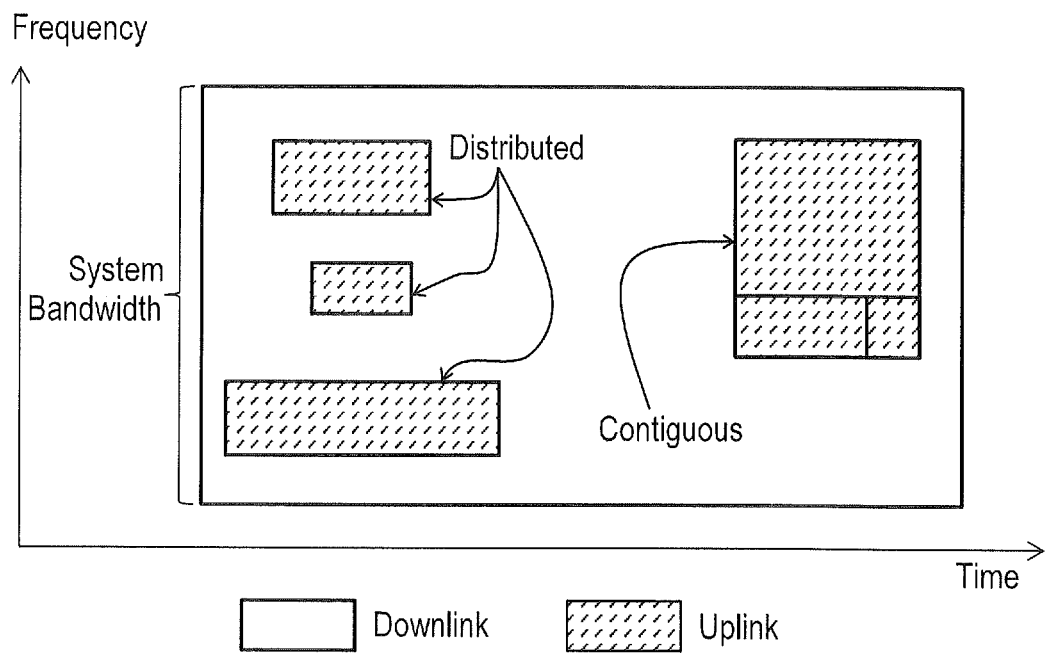
FIG. 4 schematically represents an example of a transmission mode in accordance with certain embodiments of the present disclosure.

FIG. 4 illustrates an example of a transmission mode in accordance with certain embodiments of the present disclosure. In this example, rather than using a full TDD more (where uplink and downlink transmissions are separated in time) or a full FDD mode (where uplink and downlink transmissions are separated in frequencies), the system operates in a dynamic mode where, if appropriate, uplink transmissions are fully separated in neither time nor frequency. As can be seen in FIG. 4, the downlink resources are allocated from resources in a frequency band ("system bandwidth" in FIG. 4) and from a time period or time slot.

While some uplink transmission resources can be transmitted in the same frequency band but in a difference time period (e.g. using conventional TDD), at least some of the uplink transmissions can be transmitted using resources within the frequency band and the time period. In this mode that corresponds to neither TDD nor FDD, the spectral efficiency of the network can be improved compared to the expected efficiency when using a very large bandwidth in a TDD mode.

As a result, only a subset of the frequency and/or time resources is used in the uplink whilst the rest of the resources remain for use for downlink transmissions. This is illustrated in FIG. 4 where the system bandwidth is mostly used for downlink signals with subsets of resource occasionally used for uplink signals. The uplink resource allocation can be made as deemed appropriate by the entity responsible for resource allocation (most likely to gNB). As a result, it can be distributed in frequency and/or time within the downlink resources or contiguous in time and/or frequency as shown in FIG. 4. The uplink resources illustrated can be used for uplink signals from different terminals. As mentioned above, it is expected that in most cases, the uplink resources within a set of downlink resources will be allocated by the gNB and the allocation can be signalled to one or more terminals, for example using Downlink Control Information (DCI).

Figure 5:
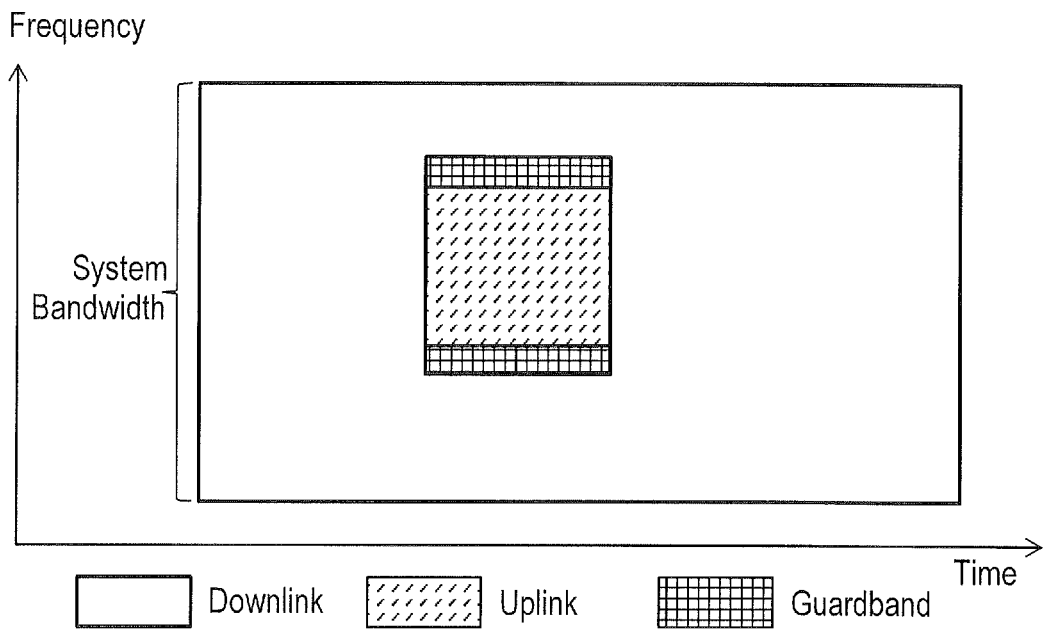
FIG. 5 schematically represents another example of a transmission mode in accordance with certain embodiments of the present disclosure.

FIG. 5 illustrates another example of a transmission mode in accordance with certain embodiments of the present disclosure. In this example, one or more frequency guard bands are inserted around each of the uplink resources to reduce interference between the uplink and downlink. In the example of FIG. 5, guardbands are used at both edges of the uplink frequency resources. In this example, a set of resources can be selected from the downlink resources and some of the resources may be allocated to one or more terminals for uplink transmissions and the remainder may be used as guardbands for isolating the uplink transmissions from the uplink transmissions.

In some examples, the guard period may also comprise resources at the edges of the uplink time resources. Like for the frequency guardband, a guard period may be useful for isolating the uplink and downlink transmissions from a time perspective. This time guard period can be used for example for half duplex terminals to switch between downlink and uplink and can be used for timing advance where a terminal switching from downlink to uplink needs to transmit the uplink early to compensate for propagation delay (such that it arrives at the boundary of the time slot at the base station).

The guardband and/or guard period parameters such as the size in frequency and/or time can in some examples be predefined or, in other examples, configured by the gNB. It is noteworthy that while in some examples the location of the guard band/period may be implicitly or explicitly notified or known to the terminals of the gNB, in other examples the guard bands/periods can be created by an appropriate scheduling from the gNB. For example, to create a guard band/period, the gNB can ensure that no uplink or downlink transmissions are schedules in a selected time and/or frequency region of the (otherwise) downlink resources. The guard band/period can also be activated or deactivated for example, if the uplink transmit power is less than a predefined threshold, a guard band/period is not used-otherwise it is used.

It is noteworthy that while the base station may then operate for uplink and downlink transmissions at the same time, in some examples the UE is configured in a TDD manner only. Namely, the terminal can then be configured such that when it is transmitting in the uplink, it is not receiving signals in the downlink at the same time and when it is receiving signals in the downlink, it is not transmitting in the uplink at the same time. This enables a simpler hardware implementation of the terminal then simultaneous uplink and downlink communications in a single terminal. That is, the terminal may then only need a single Radio Frequency (RF) chain at any point in time, to either transmit or receive. In such an example, the base station may either be made aware of the terminal capability or, if for example it does not know the terminal's capability or as a default setting, assume that the terminal is not capable of simultaneous uplink and downlink transmissions. As a result, the base station can then schedule uplink transmissions for a terminal in the set of downlink resources such that it does not coincide (in time) with a downlink transmission for the same terminal.

In accordance with the present disclosure, a terminal that is being allocated uplink resources in an otherwise set of downlink resources, the terminal is notified of the resources selected for the uplink transmission. In some cases where a guardband is used, the terminal may be notified of either or both of the uplink resources without the guardband and the uplink resources with the guardband. Where the terminal is notified of resources that include the guardband, the terminal can derive from this the actual uplink resources without the guardband using one or more, guardband information received from the base station and one or more pre-configured parameters. For example, pre-configured parameters can include a default fixed time and/or frequency size, a time and/or frequency dimension that is based on one or more: frequency bandwidth, a frequency (e.g. min, max, average of a bandwidth), location of signals in the downlink (the guardband may for example depend on where reference signals are transmitted in the downlink so as to minimise disruption to downlink transmissions).

In some examples, the frequency resources that are used for one or more uplink transmissions can be indicated not only to the one or more terminal for which the uplink resources allocations have been allocated, but also other terminals that are receiving downlink signals. For example, this indication can be broadcasted to all terminals served by the base station (in some instances this can be achieved via a broadcast control channel that is located in a known location within the time/frequency resources of the subframe or other relevant time period) or it can notified using dedicated signalling, such as the DCI.

Figure 6:
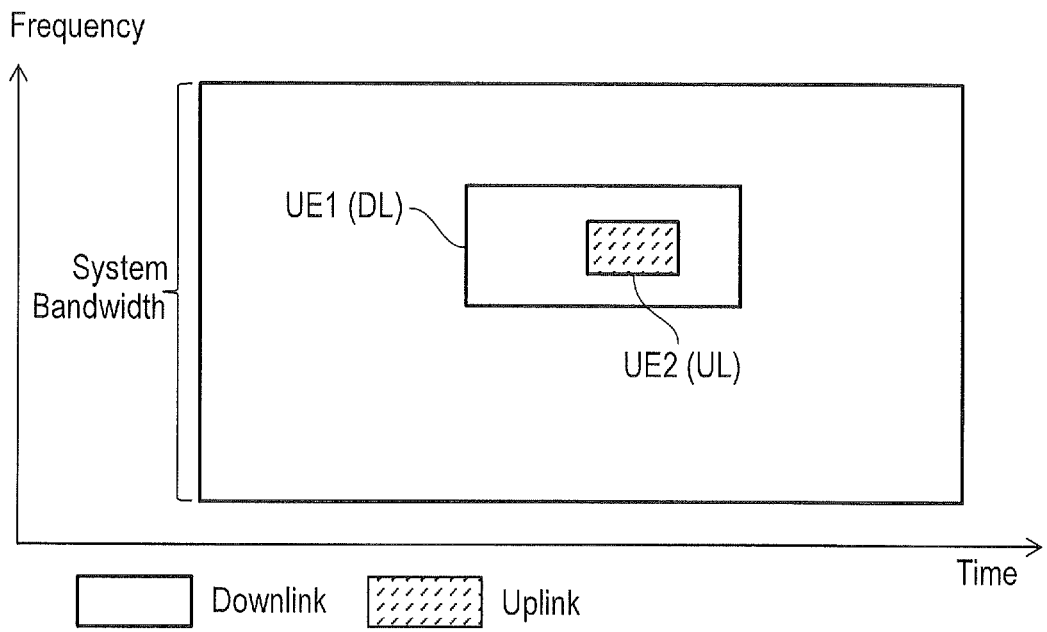
FIG. 6 schematically represents a further example of a transmission mode in accordance with certain embodiments of the present disclosure.

In some instances, the downlink reception of a first terminal may suffer from interferences with the uplink transmission of a second terminal and, if the first terminal is aware of the interference, it can attempt to take ameliorative steps when receiving signals in the downlink. For example FIG. 6 illustrates an example of a transmission mode in accordance with certain embodiments of the present disclosure wherein a first terminal UE1 receives a downlink transmission that may interfere with uplink transmissions from a second terminal UE2. This is caused by UE1 receiving in the downlink using first downlink resources while a subset of UE1's frequency and time resources are allocated for UE2 to transmit in the uplink. The gNB can signal to UE1 the uplink resources occupied by UE2 and, depending on the terminal configuration and depending on whether the resources allocated for the uplink transmissions are still used for downlink transmissions at the same time, UE1 can attempt to perform interference cancellation on the uplink resources, or can puncture the DL allocation that it is receiving in the region of the UL allocation to UE2 so as to receive the downlink transmission from the downlink resources allocated to UE1 except for the resources allocated to UE2.

It is noteworthy that even in cases where there is no actual overlap between the downlink and uplink transmissions (e.g. in the illustration of FIG. 6, where the base station does not transmit downlink signals in the resources allocated for UE2's uplink transmissions), it may be useful to signal to UE1 (and/or to any other UE served or within range of the base station) that there is an uplink transmission from UE2 in these resources. It can also be indicated that the uplink transmissions is a non-overlapping one, if appropriate. This information can for example be used by UE1 or any other relevant terminal when using their decoding function, such that this function takes into account the corruption to the downlink of the uplink signal from UE2—for example, when performing one or more channel estimation functions, terminal UE1 may ignore reference signals from the region that is corrupted by the uplink transmission from terminal UE2.

As mentioned above, in some case there won't be any overlap between uplink and downlink transmissions in one or more of the resources selected from a set of downlink resources and allocated for the uplink transmissions while in other cases there will be an overlap between the two. For example, the structure of the uplink signals can be designed to be sufficiently different to the structure of the downlink signals to facilitate the determination by a terminal that a downlink signal that it is being receiving is being corrupted by an uplink signal. On this topic, the reader is directed to the content of European application EP 16198538.7 filed 11 Nov. 2016 by the same applicant and entitled "Wireless Telecommunications Apparatus and Methods", the entire content of which is incorporated herein by reference.

Figure 7:
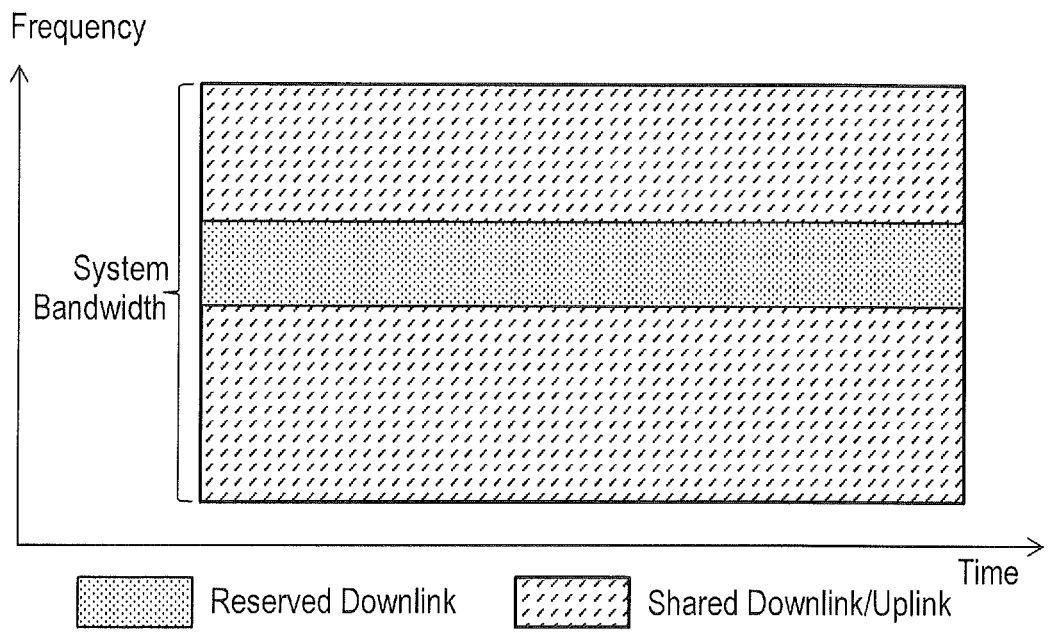
FIG. 7 schematically represents yet another example of a transmission mode in accordance with certain embodiments of the present disclosure.

FIG. 7 illustrates yet another example of a transmission mode in accordance with certain embodiments of the present disclosure. A terminal may rely on one or more downlink signals in order to perform some essential functions, such as the monitoring of cell specific reference signals (e.g. for the purposes of frequency tracking) and/or the monitoring of control channels (e.g. the Physical Downlink Control CHannel "PDCCH"). It may be beneficial to shield such signals from corruption arising from a collision with uplink transmissions. Accordingly, in example of present disclosure and as illustrated in FIG. 7, some resources may be reserved so that they are only used for downlink transmissions while the remainder of the set of downlink resources may be used to transmit uplink signals, if appropriate. In other words, outside of these reserved downlink resources, the resources may be dynamically allocated to either uplink or downlink transmissions.

In the example of FIG. 7, a central control region always operates in the downlink and can be used to transmit one or more of cell-specific reference signals (e.g. to enable the terminals to maintain frequency tracking and perform channel estimation), synchronisation signals (e.g. to enable the terminals to performs aspects of time/frequency acquisition and tracking) and control signalling (for example dedicated control channel signalling and broadcast control channel signalling). The resources outside the control region can be flexibly allocated as either downlink or uplink transmissions as discussed above. Accordingly, the resources selected from a set of downlink resources for an uplink transmission are selected from a one or more frequency ranges within the frequency range for the set of the downlink resources, wherein the one or more frequency ranges do not completely overlap with the frequency range for the set of downlink resources.

Figure 8:
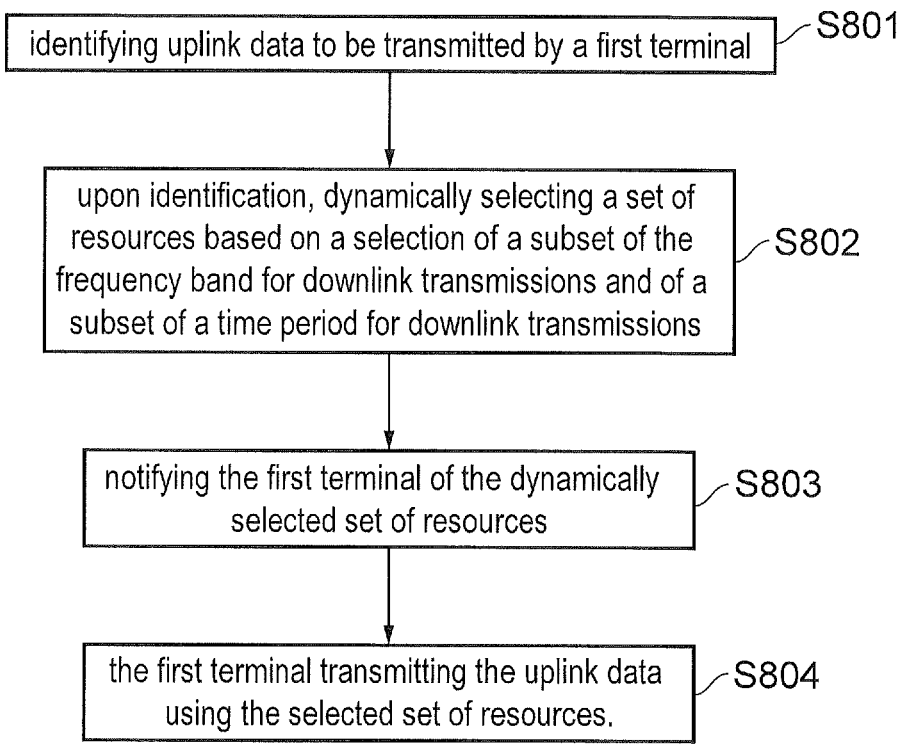
FIG. 8 schematically represents an example method in accordance with certain embodiments of the present disclosure.

FIG. 8 illustrates an example method in accordance with certain embodiments of the present disclosure. First, at step S801, uplink data to be transmitted by a first terminal is identified. This may for example be identified following a random access procedure initiated by the first terminal or using any other appropriate method (e.g. if the base station is aware of a periodic transmission from a terminal). Then, at S802, upon this identification, a set of resources is dynamically selected from a set of downlink resources and based on a selection of a subset of the frequency band for downlink transmissions and of a subset of a time period for downlink transmissions. Once the uplink resources have been selected, the first terminal is notified of the dynamically selected set of resources at S803. Once the terminal has received the notification, it can transmit uplink data using the selected set of resources (S804). Accordingly, the system enables the communication of uplink data without switching the entire system bandwidth from downlink to uplink as it would be expected in an otherwise TDD operation mode where uplink data is due to be transmitted.

While the present disclosure has been presented in view of the technologies used in the next generation of mobile networks (also called 5G, NR, etc.), it is also applicable to 4G (e.g. LTE) technologies and in particular to the arrangements being put in place for NR-LTE interworking. It is expected that these interworking arrangements will be used for some of the initial deployments of NR using high frequencies. In such a case, the LTE network would provide the coverage and NR would supplement the throughput provided by the LTE network. Typically this supplement would be used in the downlink. LTE networks conventionally use FDD rather than TDD, while the NR technology used to supplement the LTE network is expected to use TDD. The TDD band of the NR network can employ flexible and dynamical allocation of resources as described in this invention. For such an operation, the network may attempt to minimise uplink transmissions with a view to reducing inter-cell interference (uplink from one cell interfering with downlink of another cell) and intra-cell interference (where uplink from one UE interferes with downlink of another UE in the same cell). In other words, the teachings and the techniques discussed herein may be used in a pure 5G/NR network or may be used in a network implementing both 4G/LTE and 5G/NR technologies.

In an example implementation of NR-LTE interworking, the uplink NR transmission sent using the techniques discussed herein can be restricted to only Uplink Control Information (UCI). The UCI is used for transmitting uplink physical control information such as HARQ-ACK, CSI (Channel State Information) and PMI (Physical Matrix Index). Other uplink data can be transmitted using conventional LTE. For example, in cases where there is large amount of downlink traffic being transmitted or to be transmitted, restricting uplink transmission in downlink resources to transmitting UCI would minimise the uplink use on the otherwise downlink bandwidth—thereby ensure that the uplink transmissions have a limited negative impact on the downlink transmissions.

In another embodiment of the NR-LTE interworking operation, a Transport Block size (TBS) threshold TTBS can be configured for the terminal. This threshold can be used as follows: if the TBS is above the TTBS threshold, then the uplink transmission is sent using LTE otherwise it is transmitted using NR. This example is also applicable for NR single- or multi-carrier operation. Accordingly, the techniques discussed can be used when the amount of uplink data is minimal and, if the amount of uplink data is relatively substantial (i.e. more than a threshold), it can be sent in a conventional manner using LTE uplink resources. As in the above example, this could be useful when there is a relatively heavy downlink traffic so as to reduce the impact of the uplink transmissions on the downlink transmissions.

In another example, some higher layer message flows (or higher layer message elements) can be sent using LTE while other types of messages are transmitted using NR. For example, RLC/PDCP/TCP acknowledgement/control signalling may be transmitted on the NR uplink while user data (e.g. from an application) can be transmitted on the LTE uplink. This would also assist in minimising the impact of the uplink transmissions on the downlink transmissions in particular when a large proportion of the downlink resources are used for downlink transmissions.

As the skilled person will recognise, periodic uplink transmissions can sometimes be sent in NR (for example to enable the gNB to derive channel sounding measurements). In an example of the present disclosure, when the terminal has small amounts of uplink data to send (e.g. UCI) at times that coincide with these periodic transmissions, such data is transmitted using NR using the techniques of the present disclosure if appropriate. Otherwise (if for example the size of the data exceeds a threshold), such data can be transmitted using the LTE network.

In an example of the disclosure, the gNB instructs the UE whether to send data on the NR carrier or the LTE carrier. If the UE has small amounts of data to send and the gNB needs to receive an UL signal on the NR carrier in order to sound the channel on NR, the gNB can for example decide to instruct the UE to send the UL data on the NR carrier. The instruction can be sent on a downlink control channel signalling, such as the DCI.

Returning to NR networks (whether operating independently or in combination with an LTE network), it is also expected that there will be NR multi-carrier operation and the techniques discussed in the present disclosure can be used in a multi carrier mode, wherein one, some or all of the carriers can implement the techniques discussed herein.

In NR multi-carrier operation, certain higher layer message flows can be sent using lower frequency carrier (e.g. <6 GHz), otherwise they are transmitted using the higher frequency carrier (e.g. >28 GHz).

In accordance with the present disclosure, transmissions using higher frequencies would be expected to employ a flexible operation mode as discussed herein whilst those at lower frequencies would be expected to used conventional TDD or FDD. In particular, higher frequency carriers can be expected to have a larger system bandwidth compared to lower frequency carriers. As a result the teachings of the present disclosure aiming at improving the efficiency of an otherwise TDD mode (where the entire system bandwidth would have to be switched to uplink at certain times) can be found to be more useful with higher frequency carriers.

In an example of the present disclosure, a terminal is equipped with a self-interference cancellation capability (e.g. an internal RF cancellation and/or baseband cancellation of the terminal) which can be taken into account when implementing the techniques discussed herein. For example, a conventional FDD terminal without a self-interference cancellation support may be able to separate uplink signals from downlink signals with the use of a duplexer (such as a Surface Acoustic Wave "SAW" filter) configured to operate on separate centre frequencies for the uplink and downlink signals. For example, in some 3GPP FDD systems, there can be a 190 MHz gap between the two frequencies (for example downlink at 2110-2170 MHz and uplink at 1920-1980 MHz). If there is no gap between uplink and downlink, the terminal may struggle to separate the uplink and downlink from a frequency perspective. Therefore, self-cancellation techniques can be particularly useful for NR technologies because these technologies may require more flexible duplex operation modes and/or uplink-downlink allocation modes, as for example proposed herein. While a guardband may be used (see above), on other examples a terminal may support self-cancellation techniques wherein the terminal can cancel an interfering signal without a duplexer but with the knowledge of its own transmission instead. In general, the conventional uplink/downlink separation with the use of a duplexer is expected to provide better isolation capabilities compared to self-cancellation techniques without the use of a duplexer. It is noteworthy that in a TDD mode, a diplexer (which can be equivalent to duplexer in FDD) has also very good isolation capabilities compared to self-cancellation techniques. While this can be useful, and while a guardband may also be useful, in some cases, the limitations of the self-cancelling capability may not enable an accurate decoding of the transmissions. In particular, when a terminal transmit uplink signals at a maximum power or at a power close to the maximum power (for example within a certain range close to the maximum power), such decoding may be challenging. Accordingly, in some examples, if the uplink transmission power of a terminal is above a predefined threshold (which is expected to be relatively close to the maximum transmission power), the terminal switches (or requests to switch, or is automatically switched, as appropriate) to conventional TDD operation, rather than use a dynamic uplink allocation in a set of TDD downlink resources. In such a case, the diplexer (for example an RF switch) in a TDD operation mode will not suffer from interference and will be expected to be able to isolate the signals.

In summary, this can provide a TDD fall-back option if it is determined that self-cancellation capabilities of the terminal are not enough to support the flexible mode discussed herein. These teachings can apply equally to FDD and a FDD fall-back option may be provided. However, it is noteworthy that as one of the benefit of self-cancellation is that the terminal may be made less reliant on the duplexer (e.g. SAW filter) which is high cost RF component. In view of this, a TDD fall-back option is likely to be preferred over an FDD fall-back option and is expected to provide a relatively reasonable cost and complexity for the terminal.

Figure 9:
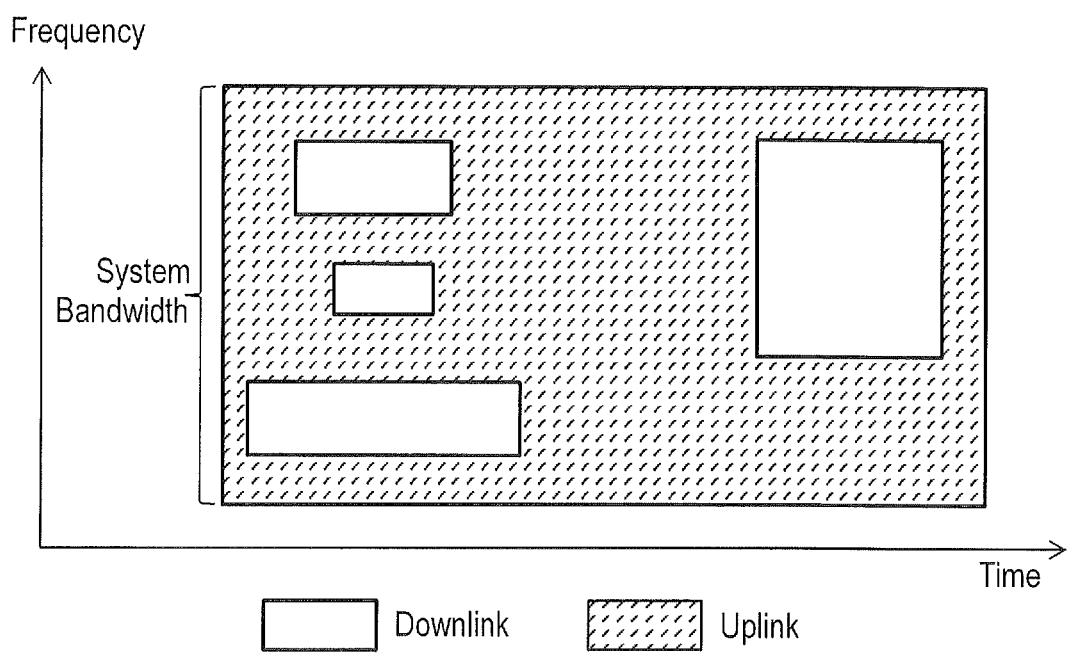
FIG. 9 schematically represents an example of a transmission mode in accordance with certain embodiments of the present disclosure.

It is noteworthy that, as the downlink is expected to use more resources than the uplink, it is generally expected that resources will be allocated to downlink transmissions by default and, if appropriate, some of these resources may be used to transmit uplink data instead—for example with a view to improving the efficiency of the system—as there would be less uplink data to transmit in general. However, it is conceivable that in some examples the role of the uplink and downlink may be swapped. For example, as the use of the uplink time slot in TDD is expected to be relatively inefficient, the time slot may be used to transmit downlink signals as well. This is for example illustrated in FIG. 9 where the resources are allocated to uplink by default in the represented time slot, but downlink signals may also be allocated resources in this frequency band and time period. The teachings discussed above apply equally to this further example of the present disclosure.

As discussed herein, the teachings of the present invention applicable are particularly applicable to NR technologies as these are expected to use relatively higher frequencies compared to previous technologies. As a result the system bandwidth is also expected to be wider which renders the flexible modes described and considered in the present disclosure more attractive. By way of example and for illustration purposes only, the system bandwidth size is expected to range from a few hundreds of MHz to potentially several GHz. In some examples, the bandwidth may be of more than 200 MHz, 400 MHz or 500 MHz, and in some examples the system bandwidth may of the order of 1 GHz or higher Aside from the bandwidth size (which can affect the efficiency of the network when having to switch the entire bandwidth to uplink/downlink), another important factor is the number of terminals currently served by the base station. For example depending on the number of terminals and on the size of their respective uplink and downlink traffic, the system might have to switch the entire (and potentially large) system bandwidth between uplink and downlink on a frequent basis. This could reduce the efficiency of the system, if for example a switch of the entire bandwidth to uplink is to transmit a small amount of uplink data—and even more so if a large amount of downlink data is also to be transmitted. The network can therefore determine which mode is believed to be the most appropriate based on one or more of: a system bandwidth size, a number of terminals, an expected size of uplink traffic to be transmitted and/or an expected size of downlink traffic to be transmitted.

Accordingly there has been provided an arrangement where the system can operate mostly in a TDD mode but when it is determined that a full TDD operation is unlikely to be efficient with respect to uplink (or downlink) transmissions, for example due to a low traffic volume and a wide bandwidth for the TDD resources, uplink resources may be allocated in a set of (TDD) downlink resources. Accordingly, the system does not have to switch the entire bandwidth to uplink transmissions. As the skilled person will appreciate, such a dynamic mode of operation will come with potentially added overhead and/or allocate of resources as guardband(s) such that it will not always be found to be the most efficient way of transmitting uplink data. In some examples, if the amount of uplink data to be transmitted is under a threshold, it can be estimated that the amount of lost resources by using a flexible allocation as discussed herein will be less than the amount of resources lost using a conventional TDD mode and thus the flexible mode will be preferred. In case where it is estimated (using a threshold and/or any appropriate calculation) that the amount of resources lost using a flexible operation will be more than compared to using a conventional TDD operation, the uplink data can be sent using a conventional TDD mode.

Some examples of the present disclosure are discussed in the numbered paragraphs below.

Paragraph 1. A method of communicating data in a telecommunications system comprising a base station and a plurality of terminals operable to communicate data to and from the base station, the system being configured to transmit downlink signals using downlink resources in a frequency band and in a first time period, the method comprising:
upon identification of uplink data to be transmitted by a first terminal of the plurality of terminals, dynamically selecting a set of resources for transmitting the uplink data, wherein selecting the set of resources comprises selecting a subset of the frequency band and a subset of the time period of the downlink resources, the selected set of resources being based on the subset of the frequency band and the subset of the time period;
notifying the first terminal of the selected set of resources; the first terminal transmitting the uplink data using the selected set of resources.

Paragraph 2. The method of Paragraph 1 wherein the system is configured to transmit all uplink signals using uplink resources in the frequency band.

Paragraph 3. The method of any preceding Paragraph further comprising identifying additional resources of the downlink resources, the additional resources being adjacent in frequency and/or time to the set of resources;
transmitting only the uplink data in the selected set of resources; and
using the additional resources as a guard band and/or guard period for the uplink data transmission.

Paragraph 4. The method of Paragraph 1 or 2 further comprising transmitting first downlink data for at least a further terminal in at least a part of the selected set of resources.

Paragraph 5. The method of any preceding Paragraph wherein notifying the first terminal comprises the base station notifying one or more terminals of the selected set of resources.

Paragraph 6. The method of any preceding Paragraph wherein the downlink resources comprises a reserved set of resources wherein the set of resources is selected from resources of the downlink resources outside of the reserved set of resources, thereby using the reserved set of resources exclusively for downlink transmissions.

Paragraph 7. The method of Paragraph 6 wherein the reserved set of resources is selected based on information about downlink and/or uplink transmissions for a neighbouring base station so as to reduce interferences between transmissions for the base station and the neighbouring base station.

Paragraph 8. The method of any preceding Paragraph wherein the identification of uplink data comprises identifying uplink control information to be transmitted by the first terminal.

Paragraph 9. The method of Paragraph 8 wherein the uplink control information comprises one or more of acknowledgement information, channel status information, pre-coding matrix indicator, channel quality indicator, noise information or power information.

Paragraph 10. The method of any preceding Paragraph wherein further comprising, based on one or both of the uplink transmission power of the first terminal and of the type of uplink data to be sent, the first terminal transmitting an indicator, the indicator comprising one or more of: an indication of the uplink transmission power and/or the type of uplink data;
a preference to use resources of the downlink resources or resources other than the downlink resources.

Paragraph 11. A system for communicating data, the system comprising a base station and a plurality of terminals operable to communicate data to and from the base station wherein the system is configured to transmit downlink signals using downlink resources in a frequency band and in a first time period, the system being configured to:
dynamically select, upon identification of uplink data to be transmitted by a first terminal of the plurality of terminals, a set of resources for transmitting the uplink data, wherein the system being configured to dynamically select the set of resources comprises the system being configured to select a subset of the frequency band and a subset of the time period of the downlink resources, the selected set of resources being based on the subset of the frequency band and the subset of the time period; notify the first terminal of the selected set of resources;

transmit from the first terminal the uplink data using the selected set of resources.

Paragraph 12. The system of Paragraph 11 wherein the system is configured to transmit all uplink signals using uplink resources in the frequency band.

Paragraph 13. The system of Paragraph 11 or 12 further configured to identify additional resources of the downlink resources, the additional resources being adjacent in frequency and/or time to the set of resources;

transmit only the uplink data in the selected set of resources; and use the additional resources as a guard band and/or guard period for the uplink data transmission.

Paragraph 14. The system of Paragraph 11 or 12 further configured to transmit first downlink data for at least a further terminal in at least a part of the selected set of resources.

Paragraph 15. The system of any of Paragraphs 11 to 14, wherein the system being configured to notify the first terminal comprises the base station being configured to notify one or more terminals of the selected set of resources.

Paragraph 16. The system of any of Paragraphs 11 to 15, wherein the downlink resources comprises a reserved set of resources wherein the set of resources is selected from resources of the downlink resources outside of the reserved set of resources, thereby using the reserved set of resources exclusively for downlink transmissions.

Paragraph 17. The system of Paragraph 16, wherein the reserved set of resources is selected based on information about downlink and/or uplink transmissions for a neighbouring base station so as to reduce interferences between transmissions for the base station and the neighbouring base station.

Paragraph 18. The system of any of Paragraphs 11 to 17, wherein the identification of uplink data comprises identifying uplink control information to be transmitted by the first terminal.

Paragraph 19. The system of Paragraph 18 wherein the uplink control information comprises one or more of acknowledgement information, channel status information, pre-coding matrix indicator, channel quality indicator, noise information or power information.

Paragraph 20. The system of any of Paragraphs 11 to 19, wherein, the first terminal is configured to transmit, based on one or both of the uplink transmission power of the first terminal and of the type of uplink data to be sent, an indicator wherein the indicator comprises one or more of:

an indication of the uplink transmission power and/or the type of uplink data;

a preference to use resources of the downlink resources or resources other than the downlink resources.

Paragraph 21. A system for communicating data, the system comprising a base station and a plurality of terminals operable to communicate data to and from the base station wherein the system is configured to implement the method of any of Paragraphs 1 to 10.

Paragraph 22. A method of communicating data in a telecommunications system comprising a base station and a plurality of terminals operable to communicate data to and from the base station, the system being configured to transmit uplink signals using uplink resources in a frequency band and in a first time period, the method comprising:

upon identification of downlink data to be transmitted to a first terminal of the plurality of terminals, dynamically selecting a set of resources for transmitting the downlink data, wherein selecting the set of resources comprises selecting a subset of the frequency band and a subset of the time period of the uplink resources, the selected set of resources being based on the subset of the frequency band and the subset of the time period;

notifying the first terminal of the selected set of resources;

transmitting the downlink data to the first terminal using the selected set of resources.

Paragraph 23. A system for communicating data, the system comprising a base station and a plurality of terminals operable to communicate data to and from the base station wherein the system is configured to transmit uplink signals using uplink resources in a frequency band and in a first time period, the system being configured to:

dynamically select, upon identification of downlink data to be transmitted by a first terminal of the plurality of terminals, a set of resources for transmitting the downlink data, wherein the system being configured to dynamically select the set of resources comprises the system being configured to select a subset of the frequency band and a subset of the time period of the uplink resources, the selected set of resources being based on the subset of the frequency band and the subset of the time period;

notify the first terminal of the selected set of resources;

transmit from the first terminal the downlink data using the selected set of resources.

Paragraph 24. A system for communicating data, the system comprising a base station and a plurality of terminals operable to communicate data to and from the base station wherein the system is configured to implement the method of Paragraph 22.

Paragraph 25. A method of operating a base station in a telecommunications system wherein the base station is operable to communicate data to and from a plurality of terminals, the base station being configured to transmit downlink signals using downlink resources in a frequency band and in a first time period, the method comprising the base station:

identifying uplink data to be transmitted by a first terminal of the plurality of terminals;

upon identification of uplink data to be transmitted by a first terminal of the plurality of terminals, dynamically selecting a set of resources for transmitting the uplink data, wherein selecting the set of resources comprises selecting a subset of the frequency band and a subset of the time period of the downlink resources, the selected set of resources being based on the subset of the frequency band and the subset of the time period;

notifying the first terminal of the selected set of resources;

receiving the uplink data from the first terminal transmitted using the selected set of resources.

Paragraph 26. The method of Paragraph 25 wherein the base station is configured to receive all uplink signals in uplink resources in the frequency band.

Paragraph 27. The method of Paragraph 25 or 26 further comprising the base station identifying additional resources of the downlink resources, the additional resources being adjacent in frequency and/or time to the set of resources;

transmitting downlink data in resources other than the selected set of resources and the additional resources; and
using the additional resources as a guard band and/or guard period for the uplink data transmission.

Paragraph 28. The method of Paragraph 25 or 26 further comprising: transmitting first downlink data for at least a further terminal in at least a part of the selected set of resources.

Paragraph 29. The method of any of Paragraphs 25 to 28 wherein notifying the first terminal comprises the base station notifying one or more terminals of the selected set of resources.

Paragraph 30. The method of any of Paragraphs 25 to 29 wherein the downlink resources comprises a reserved set of resources wherein the set of resources is selected from resources of the downlink resources outside of the reserved set of resources, thereby using the reserved set of resources exclusively for downlink transmissions.

Paragraph 31. The method of Paragraph 30 wherein the reserved set of resources is selected based on information about downlink and/or uplink transmissions for a neighbouring base station so as to reduce interferences between transmissions for the base station and the neighbouring base station.

Paragraph 32. The method of any of Paragraphs 25 to 31 wherein the identification of uplink data comprises identifying uplink control information to be transmitted by the first terminal.

Paragraph 33. The method of Paragraph 32 wherein the uplink control information comprises one or more of acknowledgement information, channel status information, pre-coding matrix indicator, channel quality indicator, noise information or power information.

Paragraph 34. The method of any of Paragraphs 25 to 33 further comprising receiving, from the first terminal, an indicator, the indicator comprising one or more of:
an indication of an uplink transmission power and/or a type of uplink data;
a preference to use resources of the downlink resources or resources other than the downlink resources.

Paragraph 35. A base station for use in a telecommunications system wherein the base station is operable to communicate data to and from a plurality of terminals, the base station being configured to transmit downlink signals using downlink resources in a frequency band and in a first time period, wherein the base station is configured to:
identify uplink data to be transmitted by a first terminal of the plurality of terminals;
dynamically select, upon identification of uplink data to be transmitted by a first terminal of the plurality of terminals, a set of resources for transmitting the uplink data, wherein the base station being configured to dynamically select the set of resources comprises the base station being configured to selecting a subset of the frequency band and a subset of the time period of the downlink resources, the selected set of resources being based on the subset of the frequency band and the subset of the time period;
notify the first terminal of the selected set of resources;
receive the uplink data from the first terminal transmitted using the selected set of resources.

Paragraph 36. The base station of Paragraph 35 wherein the base station is configured to receive all uplink signals in uplink resources in the frequency band.

Paragraph 37. The base station of Paragraph 35 or 36 further comprising the base station being configured to identify additional resources of the downlink resources, the additional resources being adjacent in frequency and/or time to the set of resources;
transmit downlink data in resources other than the selected set of resources and the additional resources; and
use the additional resources as a guard band and/or guard period for the uplink data transmission.

Paragraph 38. The base station of Paragraph 35 or 36 further configured to: transmit first downlink data for at least a further terminal in at least a part of the selected set of resources.

Paragraph 39. The base station of any of Paragraphs 35 to 38 wherein the base station being configured to notify the first terminal comprises the base station being configured to notify one or more terminals of the selected set of resources.

Paragraph 40. The base station of any of Paragraphs 35 to 39 wherein the downlink resources comprises a reserved set of resources wherein the set of resources is selected from resources of the downlink resources outside of the reserved set of resources, whereby the base station is configured to use the reserved set of resources exclusively for downlink transmissions.

Paragraph 41. The base station of Paragraph 40 wherein the reserved set of resources is selected based on information about downlink and/or uplink transmissions for a neighbouring base station so as to reduce interferences between transmissions for the base station and the neighbouring base station.

Paragraph 42. The base station of any of Paragraphs 35 to 41 wherein the base station being configured to identify uplink data comprises the base station being configured to identify uplink control information to be transmitted by the first terminal.

Paragraph 43. The base station of Paragraph 42 wherein the uplink control information comprises one or more of acknowledgement information, channel status information, pre-coding matrix indicator, channel quality indicator, noise information or power information.

Paragraph 44. The base station of any of Paragraphs 35 to 43 further configured to receive, from the first terminal, an indicator, the indicator comprising one or more of:
an indication of an uplink transmission power and/or a type of uplink data;
a preference to use resources of the downlink resources or resources other than the downlink resources.

Paragraph 45. A base station for use in a telecommunications system wherein the base station is operable to communicate data to and from a plurality of terminals wherein the base station is configured to implement the method of any of Paragraphs 35 to 44.

Paragraph 46. Circuitry for a base station for use in a telecommunications system, the base station is operable to communicate data to and from a plurality of terminals, wherein the circuitry comprises a controller element and a transceiver element configured to operate together to:
identify uplink data to be transmitted by a first terminal of the plurality of terminals;
dynamically select, upon identification of uplink data to be transmitted by a first terminal of the plurality of terminals, a set of resources for transmitting the uplink data, wherein the base station being configured to dynamically select the set of resources comprises the base station being configured to selecting a subset of the frequency band and a subset of the time period of the downlink resources, the selected set of resources being based on the subset of the frequency band and the subset of the time period;

notify the first terminal of the selected set of resources;

receive the uplink data from the first terminal transmitted using the selected set of resources.

Paragraph 47. Circuitry for a base station for use in a telecommunications system, the base station is operable to communicate data to and from a plurality of terminals, wherein the circuitry comprises a controller element and a transceiver element configured to operate together to implement the method of any of Paragraphs 35 to 44.

Paragraph 48. A method of operating a base station in a telecommunications system wherein the base station is operable to communicate data to and from a plurality of terminals, the base station being configured to receive uplink signals using uplink resources in a frequency band and in a first time period, the method comprising the base station:

identifying downlink data to be transmitted to a first terminal of the plurality of terminals;

upon identification of downlink data to be transmitted to a first terminal of the plurality of terminals, dynamically selecting a set of resources for transmitting the downlink data, wherein selecting the set of resources comprises selecting a subset of the frequency band and a subset of the time period of the uplink resources, the selected set of resources being based on the subset of the frequency band and the subset of the time period;

notifying the first terminal of the selected set of resources;

transmitting the downlink data to the first terminal using the selected set of resources.

Paragraph 49. A base station for use in a telecommunications system wherein the base station is operable to communicate data to and from a plurality of terminals, the base station being configured to transmit uplink signals using uplink resources in a frequency band and in a first time period, wherein the base station is configured to:

identify downlink data to be transmitted by a first terminal of the plurality of terminals;

dynamically select, upon identification of downlink data to be transmitted by a first terminal of the plurality of terminals, a set of resources for transmitting the downlink data, wherein the base station being configured to dynamically select the set of resources comprises the base station being configured to selecting a subset of the frequency band and a subset of the time period of the uplink resources, the selected set of resources being based on the subset of the frequency band and the subset of the time period;

notify the first terminal of the selected set of resources;

receive the downlink data from the first terminal transmitted using the selected set of resources.

Paragraph 50. A base station for use in a telecommunications system wherein the base station is operable to communicate data to and from a plurality of terminals wherein the base station is configured to implement the method of Paragraph 48.

Paragraph 51. Circuitry for a base station for use in a telecommunications system, the base station is operable to communicate data to and from a plurality of terminals, wherein the circuitry comprises a controller element and a transceiver element configured to operate together to: identify downlink data to be transmitted by a first terminal of the plurality of terminals;

dynamically select, upon identification of downlink data to be transmitted by a first terminal of the plurality of terminals, a set of resources for transmitting the downlink data, wherein the base station being configured to dynamically select the set of resources comprises the base station being configured to selecting a subset of the frequency band and a subset of the time period of the uplink resources, the selected set of resources being based on the subset of the frequency band and the subset of the time period;

notify the first terminal of the selected set of resources;

receive the downlink data from the first terminal transmitted using the selected set of resources.

Paragraph 52. Circuitry for a base station for use in a telecommunications system, the base station is operable to communicate data to and from a plurality of terminals, wherein the circuitry comprises a controller element and a transceiver element configured to operate together to implement the method of Paragraph 48.

Paragraph 53. A method of operating a terminal in a telecommunications system comprising a base station operable to communicate data to and from the terminal and a plurality of terminals, the terminal being configured to receive downlink signals using downlink resources in a frequency band and in a first time period, the method comprising:

notifying the base station of an uplink data to be transmitted;

in response to the notifying, receiving an indication of a selected set of resources for transmitting the uplink data, wherein the set of resources is selected based on a subset of the frequency band and on a subset of the time period of the downlink resources;

transmitting the uplink data using the selected set of resources.

Paragraph 54. The method of Paragraph 53 wherein the terminal is configured to transmit all uplink signals using uplink resources in the frequency band.

Paragraph 55. The method of Paragraph 53 or 54 further comprising receiving a notification of identified additional resources of the downlink resources, the additional resources being adjacent in frequency and/or time to the set of resources wherein the additional resources serve as a guard band and/or guard period for the uplink data transmission.

Paragraph 56. The method of any of Paragraphs 53 to 55 wherein receiving an indication comprises receiving an indication of the selected set of resources transmitted to one or more terminals of the plurality of terminals.

Paragraph 57. The method of any of Paragraphs 53 to 56 wherein the downlink resources comprises a reserved set of resources wherein the set of resources is selected from resources of the downlink resources outside of the reserved set of resources, thereby using the reserved set of resources exclusively for downlink transmissions.

Paragraph 58. The method of Paragraph 57 wherein the reserved set of resources is selected based on information about downlink and/or uplink transmissions for a neighbouring base station so as to reduce interferences between transmissions for the base station and the neighbouring base station.

Paragraph 59. The method of any of Paragraphs 53 to 58 wherein notifying the base station of an uplink data to be transmitted comprises identifying uplink control information to be transmitted by the terminal.

Paragraph 60. The method of Paragraph 59 wherein the uplink control information comprises one or more of acknowledgement information, channel status information, pre-coding matrix indicator, channel quality indicator, noise information or power information.

Paragraph 61. The method of any of Paragraphs 53 to 60 wherein the method comprises, based on one or both of the uplink transmission power of the first terminal and of the type of uplink data to be sent, the terminal transmitting an indicator, the indicator comprising one or more of:

an indication of the uplink transmission power and/or the type of uplink data;

a preference to use resources of the downlink resources or resources other than the downlink resources.

Paragraph 62. A terminal for use in a telecommunications system comprising a base station operable to communicate data to and from the terminal and a plurality of terminals, the terminal being configured to receive downlink signals using downlink resources in a frequency band and in a first time period, the terminal being further configured to:

notify the base station of an uplink data to be transmitted;

receive, in response to the notification, an indication of a selected set of resources for transmitting the uplink data, wherein the set of resources is selected based on a subset of the frequency band and on a subset of the time period of the downlink resources;

transmit the uplink data using the selected set of resources.

Paragraph 63. The terminal of Paragraph 62 wherein the terminal is configured to transmit all uplink signals using uplink resources in the frequency band.

Paragraph 64. The terminal of Paragraph 62 or 63 further configured to receive a notification of identified additional resources of the downlink resources, the additional resources being adjacent in frequency and/or time to the set of resources wherein the additional resources serve as a guard band and/or guard period for the uplink data transmission.

Paragraph 65. The terminal of any of Paragraphs 62 to 64 wherein the terminal being configured to receive an indication comprises the terminal being configured to receive an indication of the selected set of resources transmitted to one or more terminals of the plurality of terminals.

Paragraph 66. The terminal of any of Paragraphs 62 to 65 wherein the downlink resources comprises a reserved set of resources wherein the set of resources is selected from resources of the downlink resources outside of the reserved set of resources, thereby using the reserved set of resources exclusively for downlink transmissions.

Paragraph 67. The terminal of Paragraph 66 wherein the reserved set of resources is selected based on information about downlink and/or uplink transmissions for a neighbouring base station so as to reduce interferences between transmissions for the base station and the neighbouring base station.

Paragraph 68. The terminal of any of Paragraphs 62 to 67 wherein the terminal being configured to notify the base station of an uplink data to be transmitted comprises the terminal being configured to identify uplink control information to be transmitted by the terminal.

Paragraph 69. The terminal of Paragraph 68 wherein the uplink control information comprises one or more of acknowledgement information, channel status information, pre-coding matrix indicator, channel quality indicator, noise information or power information.

Paragraph 70. The terminal of any of Paragraphs 62 to 69 wherein the terminal is configured to, based on one or both of the uplink transmission power of the first terminal and of the type of uplink data to be sent, transmit an indicator, the indicator comprising one or more of:

an indication of the uplink transmission power and/or the type of uplink data;

a preference to use resources of the downlink resources or resources other than the downlink resources.

Paragraph 71. A terminal for use in a telecommunications system comprising a base station operable to communicate data to and from the terminal and a plurality of terminals, the terminal being configured to implement the method of any of Paragraphs 53 to 61.

Paragraph 72. Circuitry for a terminal for use in a telecommunications system comprising a base station operable to communicate data to and from the terminal and a plurality of terminals, wherein the circuitry comprises a controller element and a transceiver element configured to operate together to:

notify the base station of an uplink data to be transmitted;

receive, in response to the notification, an indication of a selected set of resources for transmitting the uplink data, wherein the set of resources is selected based on a subset of the frequency band and on a subset of the time period of the downlink resources;

transmit the uplink data using the selected set of resources.

Paragraph 73. Circuitry for a terminal for use in a telecommunications system comprising a base station operable to communicate data to and from the terminal and a plurality of terminals, wherein the circuitry comprises a controller element and a transceiver element configured to operate together to implement the method of any of Paragraphs 53 to 61

Paragraph 74. A method of operating a terminal in a telecommunications system comprising a base station operable to communicate data to and from the terminal and a plurality of terminals, the terminal being configured to transmit uplink signals using uplink resources in a frequency band and in a first time period, the method comprising:

receiving an indication of a selected set of resources for transmitting the downlink data, wherein the set of resources is selected based on a subset of the frequency band and on a subset of the time period of the uplink resources;

receiving the downlink data using the selected set of resources.

Paragraph 75. A terminal for use in a telecommunications system comprising a base station operable to communicate data to and from the terminal and a plurality of terminals, the terminal being configured to receive uplink signals using uplink resources in a frequency band and in a first time period, the terminal being further configured to:

notify the base station of an downlink data to be transmitted;

receive, in response to the notification, an indication of a selected set of resources for transmitting the downlink data, wherein the set of resources is selected based on a subset of the frequency band and on a subset of the time period of the uplink resources;

transmit the downlink data using the selected set of resources.

Paragraph 76. A terminal for use in a telecommunications system comprising a base station operable to communicate data to and from the terminal and a plurality of terminals, the terminal being configured to implement the method of Paragraph 74.

Paragraph 77. Circuitry for a terminal for use in a telecommunications system comprising a base station operable to communicate data to and from the terminal and a plurality of terminals, wherein the circuitry comprises a controller element and a transceiver element configured to operate together to:
notify the base station of an downlink data to be transmitted;
receive, in response to the notification, an indication of a selected set of resources for transmitting the downlink data, wherein the set of resources is selected based on a subset of the frequency band and on a subset of the time period of the uplink resources;
transmit the downlink data using the selected set of resources.

Paragraph 78. Circuitry for a terminal for use in a telecommunications system comprising a base station operable to communicate data to and from the terminal and a plurality of terminals, wherein the circuitry comprises a controller element and a transceiver element configured to operate together to implement the method of Paragraph 74.

The aspects of any of the above paragraphs may be implemented using any relevant technologies, for example using any one or more of a 3GPP, 3G, 4G (LTE or other), 5G (NR or other) network.

REFERENCES

[1] Holma H. and Toskala A, "LTE for UMTS OFDMA and SC-FDMA based radio access", John Wiley and Sons, 2009

The invention claimed is:

1. A method of communicating data in a telecommunications system comprising a base station and a plurality of terminals to communicate data to and from the base station, the system being configured to transmit downlink signals using downlink resources in a frequency band and in a first time slot, the method comprising:
upon identification of uplink data to be transmitted by a first terminal of the plurality of terminals, dynamically selecting a set of resources to transmit the uplink data, wherein said dynamically selecting the set of resources comprises selecting a subset of the frequency band and a subset of the first time slot of the downlink resources, the selected set of resources being based on the subset of the frequency band and the subset of the first time slot;
notifying the first terminal of the selected set of resources; and
transmitting the uplink data using the first terminal and the selected set of resources,
wherein said transmitting is according to a dynamic mode whereby the uplink transmission of the uplink data is fully separated in neither time nor frequency from the frequency band and the first time slot of the downlink resources, and
wherein for the dynamic mode the subset of the frequency band and/or the subset of the first time slot is/are contiguous in frequency and/or time, respectively.

2. The method of claim 1 wherein the system is configured to transmit all uplink signals using uplink resources in the frequency band.

3. The method of claim 1 further comprising:
identifying additional resources of the downlink resources, the additional resources being adjacent in frequency and/or time to the set of resources;
transmitting only the uplink data in the selected set of resources; and
using the additional resources as a guard band and/or guard period for the uplink data transmission.

4. The method of claim 1 further comprising transmitting first downlink data for at least a further terminal in at least a part of the selected set of resources.

5. The method of claim 1 wherein said notifying the first terminal comprises the base station notifying one or more terminals of the selected set of resources.

6. The method of claim 1 wherein the downlink resources comprise a reserved set of resources wherein the set of resources is selected from resources of the downlink resources outside of the reserved set of resources, thereby using the reserved set of resources exclusively for downlink transmissions.

7. The method of claim 6 wherein the reserved set of resources is selected based on information about downlink and/or uplink transmissions for a neighboring base station so as to reduce interferences between transmissions for the base station and the neighboring base station.

8. The method of claim 1 wherein the identification of uplink data comprises identifying uplink control information to be transmitted by the first terminal.

9. The method of claim 8 wherein the uplink control information comprises one or more of acknowledgement information, channel status information, pre-coding matrix indicator, channel quality indicator, noise information or power information.

10. The method of claim 1 further comprising, based on one or both of an uplink transmission power of the first terminal and of a type of uplink data to be sent, the first terminal transmitting an indicator, the indicator comprising one or more of:
an indication of the uplink transmission power and/or the type of uplink data; and
a preference to use resources of the downlink resources or resources other than the downlink resources,
wherein the downlink resources comprise a reserved set of resources used exclusively for downlink transmissions, and
wherein the reserved set of resources is selected based on information about downlink and/or uplink transmissions for a neighboring base station so as to reduce interferences between transmissions for the base station and the neighboring base station.

11. A base station for use in a telecommunications system to communicate data to and from a plurality of terminals, the base station being configured to transmit downlink signals using downlink resources in a frequency band and in a first time period, wherein the base station is configured to:
identify uplink data to be transmitted by a first terminal of the plurality of terminals;
dynamically select, upon identification of uplink data to be transmitted by the first terminal of the plurality of terminals, a set of resources to transmit the uplink data, wherein the base station being configured to dynamically select the set of resources comprises the base station being configured to selecting a subset of the frequency band and a subset of the first time period of the downlink resources, the selected set of resources being based on the subset of the frequency band and the subset of the first time period;
notify the first terminal of the selected set of resources; and
receive the uplink data from the first terminal transmitted using the selected set of resources, wherein the received uplink data from the first terminal is based on a dynamic mode at the first terminal whereby the received uplink data is fully within both the frequency band and the first time period associated with the downlink resources, and wherein for the dynamic mode the subset of the first time period is contiguous in time.

12. The base station of claim 11 wherein the base station is configured to receive all uplink signals in uplink resources in the frequency band.

13. The base station of claim 11 further comprising the base station being configured to identify additional resources of the downlink resources, the additional resources being adjacent in frequency and/or time to the set of resources;

transmit downlink data in resources other than the selected set of resources and the additional resources; and use the additional resources as a guard band and/or guard period for the uplink data transmission.

14. The base station of claim 11 wherein the received uplink data has a distributed portion and/or a contiguous portion in the frequency band and/or the first time period associated with the downlink resources.

15. The base station of claim 11 wherein the downlink resources comprise a reserved set of resources wherein the set of resources is selected from resources of the downlink resources outside of the reserved set of resources, whereby the base station is configured to use the reserved set of resources exclusively for downlink transmissions.

16. A terminal for use in a telecommunications system comprising a base station to communicate data to and from the terminal and a plurality of terminals, the terminal being configured to receive downlink signals using downlink resources in a frequency band and in a first predetermined time period, the terminal being further configured to:

notify the base station of an uplink data to be transmitted;

receive, in response to the notification, an indication of a selected set of resources to transmit the uplink data, wherein the set of resources is selected based on a subset of the frequency band and on a subset of the first predetermined time period of the downlink resources; and transmit the uplink data using the selected set of resources, wherein the transmission of the uplink data is such that the uplink data is fully separated in neither time nor frequency from the frequency band and the first predetermined time period of the downlink resources, and wherein for the dynamic mode the subset of the frequency band and the subset of the first predetermined time period are contiguous in frequency and time, respectively.

17. The terminal of claim 16 wherein the terminal is configured to transmit all uplink signals using uplink resources in the frequency band.

18. The terminal of claim 16 further configured to receive a notification of identified additional resources of the downlink resources, the additional resources being adjacent in frequency and/or time to the set of resources wherein the additional resources serve as a guard band and/or guard period for the uplink data transmission.

19. The terminal of claim 16 wherein the terminal being configured to notify the base station of an uplink data to be transmitted comprises the terminal being configured to identify uplink control information to be transmitted by the terminal.

20. The terminal of claim 19 wherein the uplink control information comprises one or more of acknowledgement information, channel status information, pre-coding matrix indicator, channel quality indicator, noise information or power information.

* * * * *